J. W. PEIRCE.
HEAT RADIATOR.
APPLICATION FILED AUG. 16, 1917.
1,261,160. Patented Apr. 2, 1918.
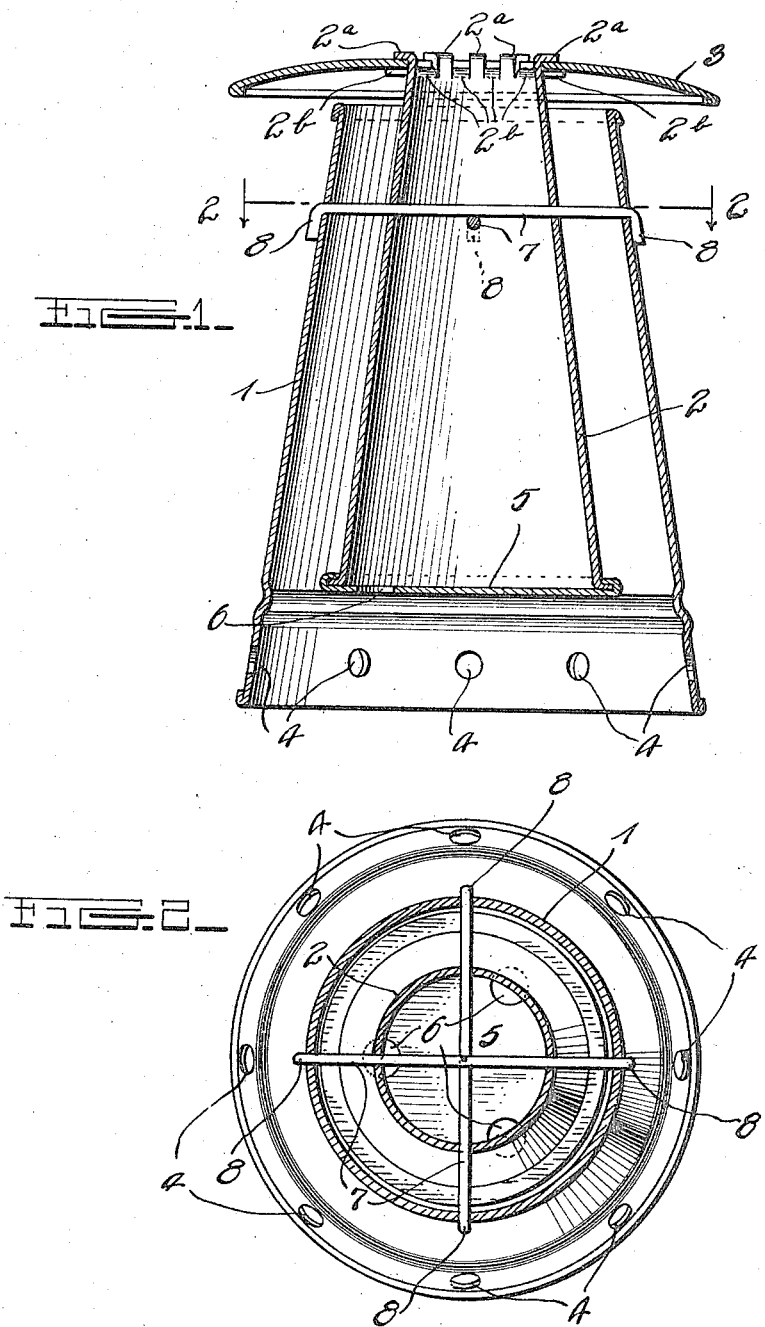
Witness
George W. Giovannetti
Inventor
J. W. Peirce
By H. B. Willson & Co.
Attorneys

UNITED STATES PATENT OFFICE.

JOSEPH W. PEIRCE, OF CORNISH, NEW HAMPSHIRE.

HEAT-RADIATOR.

1,261,160.     Specification of Letters Patent.     Patented Apr. 2, 1918.

Application filed August 16, 1917. Serial No. 186,592.

*To all whom it may concern:*

Be it known that I, JOSEPH W. PEIRCE, a citizen of the United States, residing at Cornish, in the county of Sullivan and State of New Hampshire, have invented certain new and useful Improvements in Heat-Radiators; and I do declare the following to be a full, clear, and exact description of the invention, such as will enable others skilled in the art to which it appertains to make and use the same.

My invention aims to provide a simple and inexpensive yet highly efficient device to be placed on top of oil, gas, or other smokeless heaters to receive and radiate the heat discharged from the upper end of the heater shell, and with this general object in view, the invention resides in the unique features of construction hereinafter fully described and claimed, the descriptive matter being supplemented by the accompanying drawing which constitutes a part of this application and in which:—

Figure 1 is a vertical section of the improved radiator; and

Fig. 2 is a horizontal section on the plane of the line 2—2 of Fig. 1.

The improved radiator consists primarily of three parts, an outer shell 1, an inner shell 2 and dome 3 carried by the upper end of said inner shell.

The outer shell 1 is frusto-cone-shaped and is formed of sheet metal, being provided at its lower end with an annular series of perforations 4, both the upper and lower ends of said shell being open.

The inner shell 2 is spaced a suitable distance from the shell 1 and is closed at its lower end by a bottom 5 formed with perforations 6. The upper end of the shell 2 extends above the outer shell and as above stated carries the dome 3, said dome being formed of a single sheet metal disk bent to shape with its lower edge disposed slightly above the horizontal plane in which the upper end of shell 1 is located.

Dome 3 is preferably secured to the inner shell 2 by means of upper and lower fingers 2ᵃ and 2ᵇ which respectively overlie and underlie said dome at the inner edge thereof, these fingers being formed by slitting the upper end of the shell 2 and bending the material between the slits outwardly.

For supporting the shell 2 within the outer shell, a pair of wires 7 are passed through both shells and are preferably bent downward at their ends as shown at 8.

In use, the device is set upon the top of an oil heater so that the hot air rising through the usual openings in said top will be more or less trapped in the outer shell 1. Some of this air will be expelled through the openings 4, some from the upper end of the shell 1 beneath the dome 3, and some will pass through the perforations 6 and will be discharged from the open end of shell 2. The entire device will thus be effectively heated and due to the large radiating surface thereof, the efficiency of the heater will be greatly increased, thus causing economy of fuel to a noticeable extent.

I claim:—

1. A radiator of the class described comprising a frusto-cone-shaped outer shell open at both ends and having perforations at its lower end, an inner frusto-cone-shaped shell within said outer shell and spaced therefrom, the lower end of said inner shell having a perforated bottom, while the upper end of said inner shell is open and extends above the upper end of the outer shell, a dome extending outwardly from said upper end of the inner shell above and beyond the outer shell, and means supporting the inner shell within the outer shell.

2. A radiator of the class described comprising a frusto-cone-shaped outer shell open at both ends and having perforations at its lower end, an inner frusto-cone-shaped shell within said outer shell and spaced therefrom, the lower end of said inner shell having a perforated bottom, while the upper end of said inner shell is open and extends above the upper end of the outer shell, a dome extending outwardly from said upper end of the inner shell above and beyond the outer shell, and crossed wires passed through both shells for supporting the inner shell within the outer shell.

In testimony whereof I have hereunto set my hand in the presence of two subscribing witnesses.

JOSEPH W. PEIRCE.

Witnesses:
    FRANCIS W. JOHNSTON,
    HOWARD F. MARSHALL.